Aug. 18, 1931.  H. SAUNDERS  1,819,268
PICTURE SCREEN
Filed Feb. 4, 1929
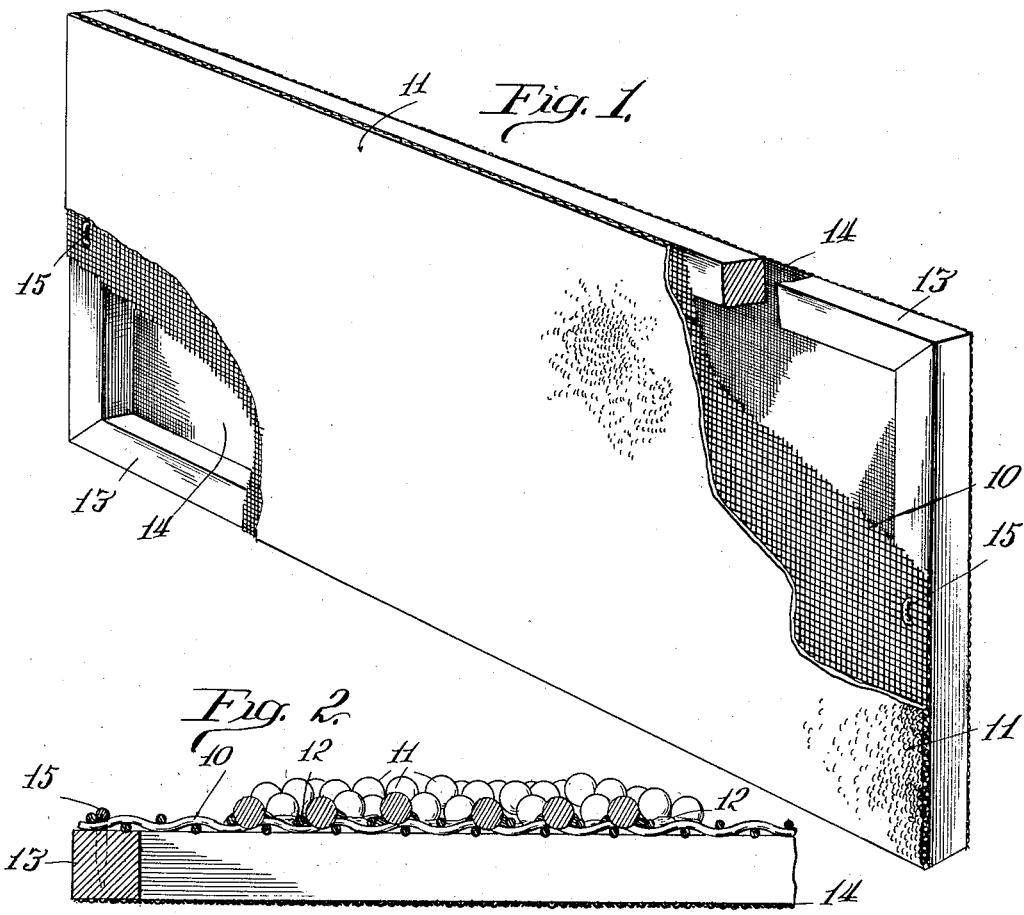
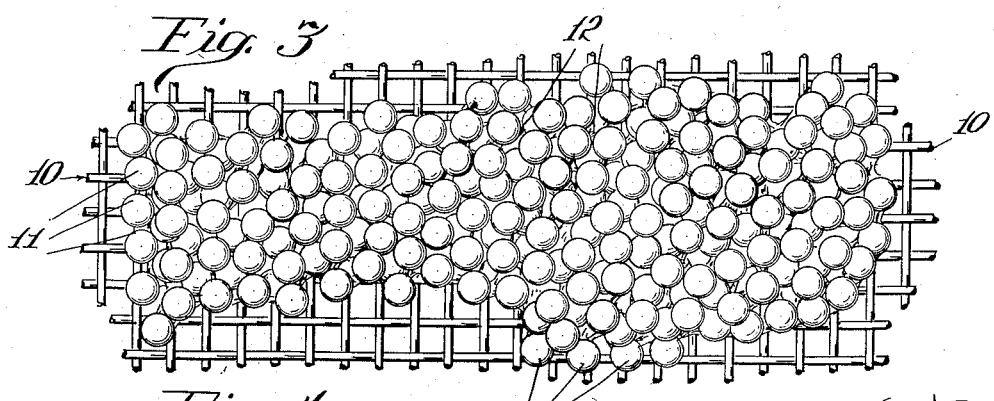
Inventor
Homer Saunders
By Thomas H. Ferguson
Attorney Patented Aug. 18, 1931

1,819,268

UNITED STATES PATENT OFFICE

HOMER SAUNDERS, OF CHICAGO, ILLINOIS

PICTURE SCREEN

Application filed February 4, 1929. Serial No. 337,425.

The present invention relates to screens of the class employed with picture projecting apparatus. The advent of the talking picture has presented a problem in the art of screen manufacture which has not been solved heretofore. That problem is to provide a screen to so reflect the light as to give a clear and attractive picture while at the same time providing for a ready flow of sound through the screen to give a clear and natural sound to the hearers. Heretofore attempts to improve the sound features of the screen have been made at the expense of the light reflecting properties; hence good sound transmission has produced poorer pictures. On the other hand, those structures which furnish good pictures have no porosity, and hence their sound properties are poor.

The object of the present invention is to produce a screen having good light and sound properties, that is to say, capable of furnishing good light reflection and at the same time good porosity to sound waves, thereby giving full satisfaction, both in seeing and hearing, to the persons attending the production.

To this end I produce a sound porous screen which gives at the same time a high degree of light reflection. The light reflecting properties are obtained by using small globular light reflecting bodies, such as glass beads, in connection with a light reflecting adhesive for holding the beads in place upon the base. The sound porous feature is provided by employing an open mesh base and attaching these globular bodies to it by the adhesive. The employment of the mesh results in there being openings not only by reason of some of the meshes being left uncovered by the globular bodies, but the adhesive itself also clings to the strands of the mesh and leaves openings through the screen in the form of pores variously distributed. Then, preferably, I also employ a white porous backing fabric. This is located behind the base close to it, or at a suitable distance from it, as may be best in any given situation. The backing, being porous, allows the sound waves to pass through it readily and at the same time, by reason of its whiteness, reflects any light that may have passed through the mesh of the base, back to the transparent or translucent crystal-like bodies which form the face of the structure.

Having pointed out the general character and features of the invention, reference may now be had to the accompanying drawings and the following detailed description, wherein the invention is more fully disclosed; while at the same time reference may be had to the appended claims for an expression of the extent and scope of the invention.

Referring to said drawings, Fig. 1 is a perspective view of a small screen constructed in accordance with the present invention, parts being broken away to more clearly show the construction; Fig. 2 is a transverse section of a portion of the same, showing the parts upon a greatly enlarged scale; Fig. 3 is a face view of a portion of the screen illustrating the same as it appears through a microscope; and Fig. 4 is a view, similar to Fig. 2, of a modification wherein the backing lies close to the rear surface of the metal base structure. Throughout these views, like characters refer to like parts.

Referring to said drawings in detail, 10 designates a metal base of open mesh; 11, globular light reflecting bodies which form the face of the screen; and 12, the light-reflecting adhesive by which the globular bodies are secured to the base. The structure composing these several parts may be mounted in any suitable way, and in the present instance a frame 13 is provided for the attachment of the base 10. In addition to these parts the structure includes a backing 14 which is preferably spaced from the rear of the base 10 as shown in Fig. 1, but may be located close to the rear of the base 10 as shown in Fig. 4.

The base 10 in most instances will consist of a wire screen of very small mesh. For this purpose a screen having about seventy (70) strands to the inch gives good results. In some instances the maker of the screen may desire a coarser mesh, say fifty (50) or sixty (60) strands to the inch. The wire composing the screen is also preferably a durable wire of copper, brass, steel or other metal. The base 10 may be specially treated if desired. In some cases it is preferable to have the same tinned. In other instances it may be desirable to have it otherwise treated before going into the structure of the screen. Thus, I have found that a galvanized steel wire gives good results. Providing such a base furnishes openings which assist in the formation of pores when the adhesive and crystal-like bodies which form the face are added. Constructing the base of metal also makes a mechanically strong and durable structure.

Where cloth is used as has been done in making picture screens heretofore in use, an accidental blow may tear the cloth and where it does so, it is very difficult to mend the same and to restore the screen to its original appearance. By the use of metal and especially wire screen, as I propose, it is easy to restore the screen to its normal condition by the use of a mallet and block. If the injury is so severe that the globular bodies have been broken off then it is easy to apply a little adhesive and restore the surface of the screen by supplying additional globular bodies.

The globular bodies 11 which form the surface coating of the screen may take different forms. The purpose of these bodies is to reflect the light which comes from the picture projecting apparatus. Consequently, they should be clear and preferably transparent or translucent. In practice, glass beads of small diameter meet these requirements quite satisfactorily. These beads are very small. Compared to the mesh of the metal base 10 they are preferably just large enough so as not to go through the openings in the base. However, their size may be varied through a considerable range without appreciable loss in efficiency. The size best suited to any given situation must be left quite largely to the judgment of the manufacturer. These minute bodies covering the surface of the screen produce a sheen and an iridescent or opalescent appearance that lends itself well to the reproduction of pictures, whether still or moving, when projected by the ordinary picture projecting apparatus. This effect is especially noticeable in artificial light, such as is available in the ordinary picture theatre.

It will be seen that because of the small size of the beads, or other objects which constitute the surface coating of the screen, the number employed in the manufacture of any one screen of ordinary size is very large. Indeed one might say that numberless beads are employed. The appearance of the coated base, at first blush, is not unlike sandpaper, but a further examination soon reveals the fact that the surface particles are quite different. It is only when the surface is examined under a microscope that its real structure is fuller apparent. An attempt has been made to bring this out by the representations in Fig. 3. As there shown the adhesive 12 adheres to the strands of the mesh of the base 10 and to the globular bodies 11. As a result, the latter bodies are firmly held to the base and provide an attractive coating which appears smooth and even to the picture observer even though the bodies themselves may be quite unevenly distributed when examined through the microscope. But this microscopically rough surface does not injuriously affect the proper functioning of the screen. Porous openings are left between the different globular bodies and through the meshes of the screen for the passage of the sound waves and at the same time the light reflecting properties are retained. Thus, the new screen is particularly suitable for the presentation of talking pictures.

In this connection it may be pointed out that the adhesive 12 does not close up the meshes of the base 10 as is the case where a knitted or woven cloth fabric is used as a base for a bead coating. In such case the coating placed upon the knitted or woven base fills all the pores, and while serving well to reflect the light projected by the picture apparatus, does not permit the passage of sound waves. As a result, a character over at one side of the picture who is supposed to be talking may be quite separated from the sound which he is supposed to be uttering. With the porous screen I have provided, it is possible to bring the sound producer for the character directly behind the character and thus the talking picture is more realistic.

One purpose of the adhesive 12 is to hold the globular bodies 11 upon the perforated base 10. This is its function from the mechanical point of view. From the optical viewpoint it performs the function of reflecting the light coming from the projecting apparatus. In this respect it is like the beads, or other globular bodies, which it holds in place. Ordinarily, I employ as an adhesive, spar varnish mixed with aluminum powder. The varnish serves the mechanical function and the aluminum powder assists in the reflection of the light rays. In making up the screen structure, the adhesive is sprayed upon the base 10 and then numberless glass beads of the requisite size are deposited upon the surface of the varnish, and when the latter has sufficiently set the surplus beads are removed. Obviously it is preferable to apply the adhesive uniformly to the base in order to get a uniform distribution of the beads upon the surface of the finished structure. As shown in Fig. 3, the adhesive clings mostly to the strands forming the mesh and such adhesive does not close up the meshes in the base, but leaves openings variously distributed over the base. Likewise the beads when distributed do not regularly and completely cover the entire screen but are attached with considerable irregularity, thereby leaving pores between them and through the openings of the base, left by the adhesive clinging to the strands of the mesh, as before stated. But, as previously noted, such irregularity in the globular coating produces no ill effect upon the projected picture.

The frame 13 is here shown as a simple wooden frame made up of four members, joined at their corners. Such illustration, however, is merely typical, as frames for picture screens are manufactured out of other materials and in various ways. In the embodiment illustrated, the base screen 10 is attached to the frame 13 by any suitable means, such as staples 15. This may be done before the adhesive and the beads are applied to the base. However, this is not essential, and, in certain instances, it may be desirable to make up the screen structure in such form that it can be rolled and shipped as a roll. In such a case, the finished screen would be applied to the frame at the point of installation and long after the screen structure had been completed. Where so applied, the same may be held to the frame by any suitable means. It is not deemed necessary to further illustrate ways of attaching the screen structure to the frame.

In addition to the structure embodying the base 10, the beads 11 and the adhesive 12, it is also desirable to employ a backing 14. This backing is preferably a porous knitted or woven fabric which is white in color. By being porous it permits sound waves to pass through it and thence on through the face structure of the screen; and by being white it reflects any rays of light that may have come through the face structure, back against that structure and to a certain extent into and through the beads forming the face of the screen. Thus, the backing 14 may be ordinary bolting, sheeting, cheese-cloth, or the like. As shown in Fig. 1, this backing is spaced from the base 10 and lies behind it. The distance to which the backing 14 should be spaced will depend quite largely upon the particular installation and the same may be varied to suit different requirements. In some instances it may be quite as effective to place the backing 14 directly against the rear of the base 10. This is the arrangement illustrated in Fig. 4. In the latter event, the backing may be secured to the screen directly, or to the frame around the edges in the same manner as the backing is secured in the embodiment illustrated in Fig. 1.

The backing fabric 14 protects the rear of the beaded face structure from dust and other objectionable matter floating in the air around the screen. It can be cleaned with a duster or vacuum cleaner. On the other hand, the beaded face of the screen can be washed with soap and water or, when dry, it can be cleaned with a suction cleaner the same as the fabric 14.

It is my intention to manufacture screens according to this invention in the sizes commonly employed in picture theatres.

In carrying out my invention, many alterations and changes may be made in the particular disclosure now presented without departing from the spirit and scope of my invention. I, therefore, do not wish to be limited to the specific details of my present disclosure, but aim to cover all such alterations and changes by the terms of the appended claims.

What I claim as new and desire to secure by a patent of the United States is:

1. A sound-porous, light reflecting screen of the class described comprising a woven wire screen, a coating of adhesive on said screen clinging mostly to the strands forming the screen and thus leaving openings between coated strands through said wire screen, said openings being variously distributed over said screen, and beads substantially covering said adhesive coating and being irregularly attached thereto leaving openings among the beads, which openings extend in many instances completely through said screen, said beads approximating in size the mesh of said wire screen.

2. A screen of the class described comprising a woven wire screen, a light reflecting adhesive upon the face of said wire screen clinging mostly to the strands of the screen and leaving openings therethrough variously distributed, and a layer of light reflecting beads upon the outer surface of said adhesive clinging to said adhesive and leaving openings among the beads communicating with the aforesaid openings among the coated strands to provide for the ready passage of sound through the screen, said beads approximating in size the mesh of said wire screen.

3. A screen of the class described comprising a woven wire screen, a light reflecting adhesive upon the face of said wire screen clinging mostly to the strands of the screen and leaving openings therethrough variously distributed, a sound-porous coat of light reflecting beads clinging to said adhesive and leaving openings among the beads communicating with the aforesaid openings among the coated strands to provide for the ready passage of sound through the wire screen, said beads approximating in size the mesh of said wire screen, and a light reflecting sound-porous cloth backing said wire screen.

4. A sound-porous, light reflecting screen of the class described, comprising a metal base of open mesh, numerous globular light reflecting bodies constituting a sound pervious coating on the screen, and an interposed light reflecting adhesive material for holding said globular bodies to said base, said bodies approximating in size the mesh of said base.

5. A sound-porous light reflecting screen of the class described, comprising a metal base of open mesh, numerous globular light reflecting bodies constituting a sound pervious coating on the screen, an interposed light reflecting adhesive material for holding said globular bodies to said base, said bodies approximating in size the mesh of said base, and a porous white fabric backing said base.

In witness whereof, I hereunto subscribe my name this 2nd day of February, A. D. 1929.

HOMER SAUNDERS.